United States Patent
Jain

(10) Patent No.: US 6,288,919 B1
(45) Date of Patent: Sep. 11, 2001

(54) SINGLE STAGE AC/DC CONVERTER HIGH FREQUENCY AC DISTRIBUTION SYSTEMS

(75) Inventor: Praveen Kumar Jain, Kanata (CA)

(73) Assignee: ChipPower.com, Inc., Nepean (CA)

( * ) Notice: Subject to any disclaimer, the term of this patent is extended or adjusted under 35 U.S.C. 154(b) by 0 days.

(21) Appl. No.: 09/464,950

(22) Filed: Dec. 16, 1999

(51) Int. Cl.$^7$ .................................................. H02M 7/217
(52) U.S. Cl. ............................................. 363/89; 363/127
(58) Field of Search ...................................... 363/89, 127

(56) References Cited

U.S. PATENT DOCUMENTS

| | | | |
|---|---|---|---|
| 4,519,024 | * | 5/1985 | Federico et al. .................. 363/89 |
| 4,922,404 | * | 5/1990 | Ludwig et al. .................... 363/127 |
| 4,959,766 | | 9/1990 | Jain .................................... 363/48 |
| 5,038,266 | * | 8/1991 | Callen et al. ...................... 363/89 |
| 5,179,512 | * | 1/1993 | Fisher et al. ...................... 363/89 |
| 5,274,543 | * | 12/1993 | Loftus ............................... 363/89 |
| 5,402,480 | * | 3/1995 | Hirahara ........................... 363/127 |
| 5,742,491 | * | 4/1998 | Bowman et al. ................. 363/89 |
| 5,907,481 | * | 5/1999 | Svardsjo ........................... 363/127 |
| 5,991,167 | * | 11/1999 | Van Lerberghe ................ 363/89 |
| 6,064,580 | * | 5/2000 | Watanabe et al. ............... 363/127 |
| 6,072,701 | * | 6/2000 | Sato et al. ......................... 363/17 |
| 6,111,769 | * | 8/2000 | Zhang et al. ...................... 363/89 |

* cited by examiner

Primary Examiner—Jeffrey Sterrett
(74) Attorney, Agent, or Firm—Van Dyke, Gardner, Linn & Burkhart, LLP

(57) ABSTRACT

An AC/DC converter for outputting high current, low voltage output from a high frequency AC source is described. The AC/DC converter includes two resonant components, a resonant circuit having a capacitor and an inductor. Both of the resonant components are connected in series and form a series resonant circuit. The converter further includes a transformer having a primary winding with a center tap to a secondary winding. The resonant circuit and the primary winding are connected in series. The center tap is connected to an output filter and a load, while the other two ends of the secondary winding are connected to two controlled switches, respectively. A drain of each of the two controlled switches is connected to opposite ends of the secondary winding, while each of the sources of the two controlled switches are interconnected. Two anti-parallel diodes are respectively connected across the two controlled switches. Two capacitors are also respectively connected across the two controlled switches. The on-time of the controlled switches is regulated to control the output voltage of the converter. The advantage is an inexpensive converter adapted to output high currents at low voltages with very little ripple and very low slew rate.

45 Claims, 17 Drawing Sheets

AC/DC converter topology

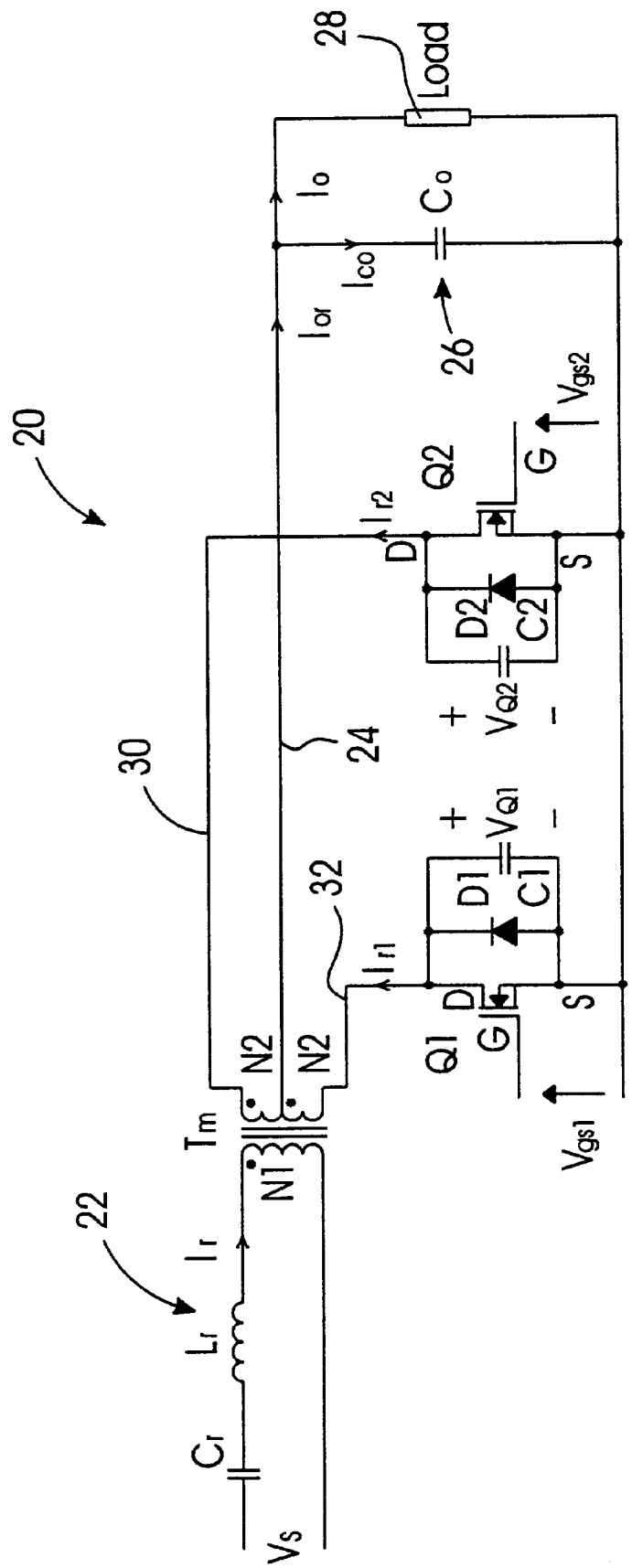
FIG. 2: AC/DC converter topology

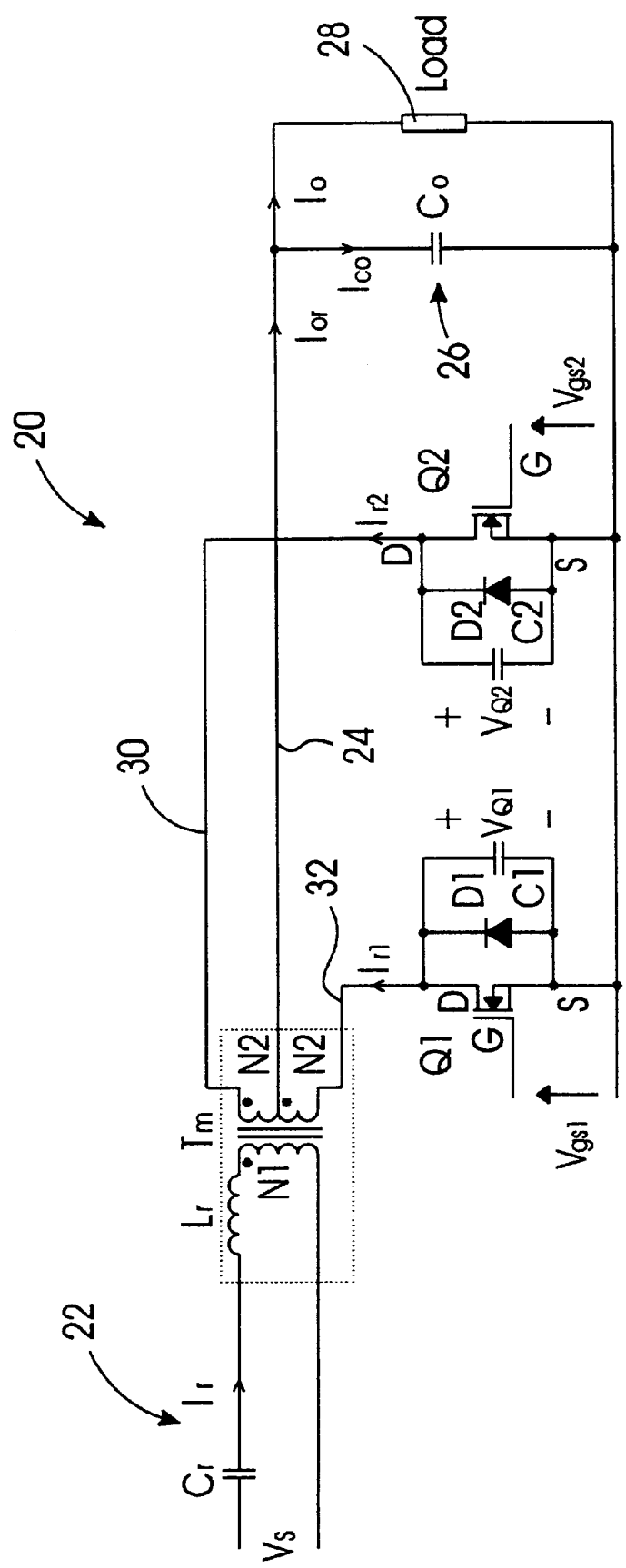
FIG. 2(a): AC/DC converter topology in which resonant inductor is same as the leakage inductance of the transformer

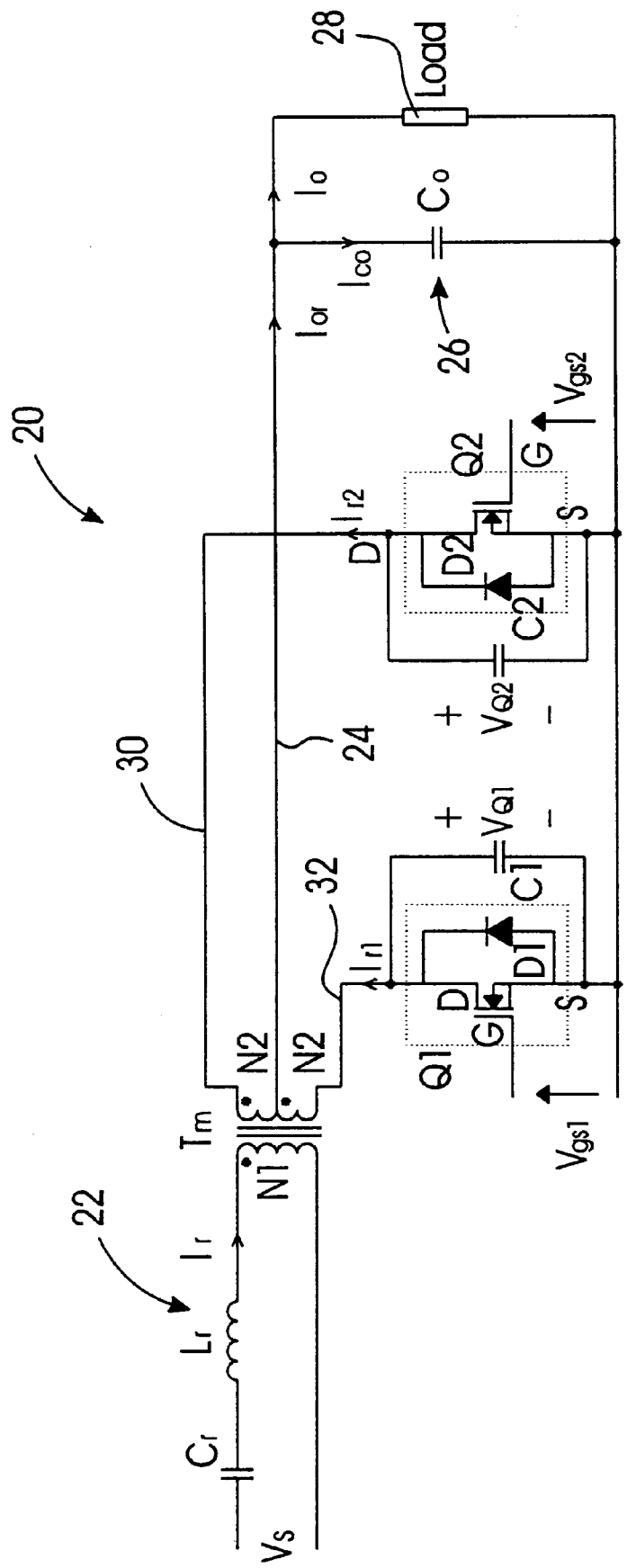
FIG. 2(b): AC/DC converter topology in which the anti-parallel diodes are the integral parts of the controlled switches.

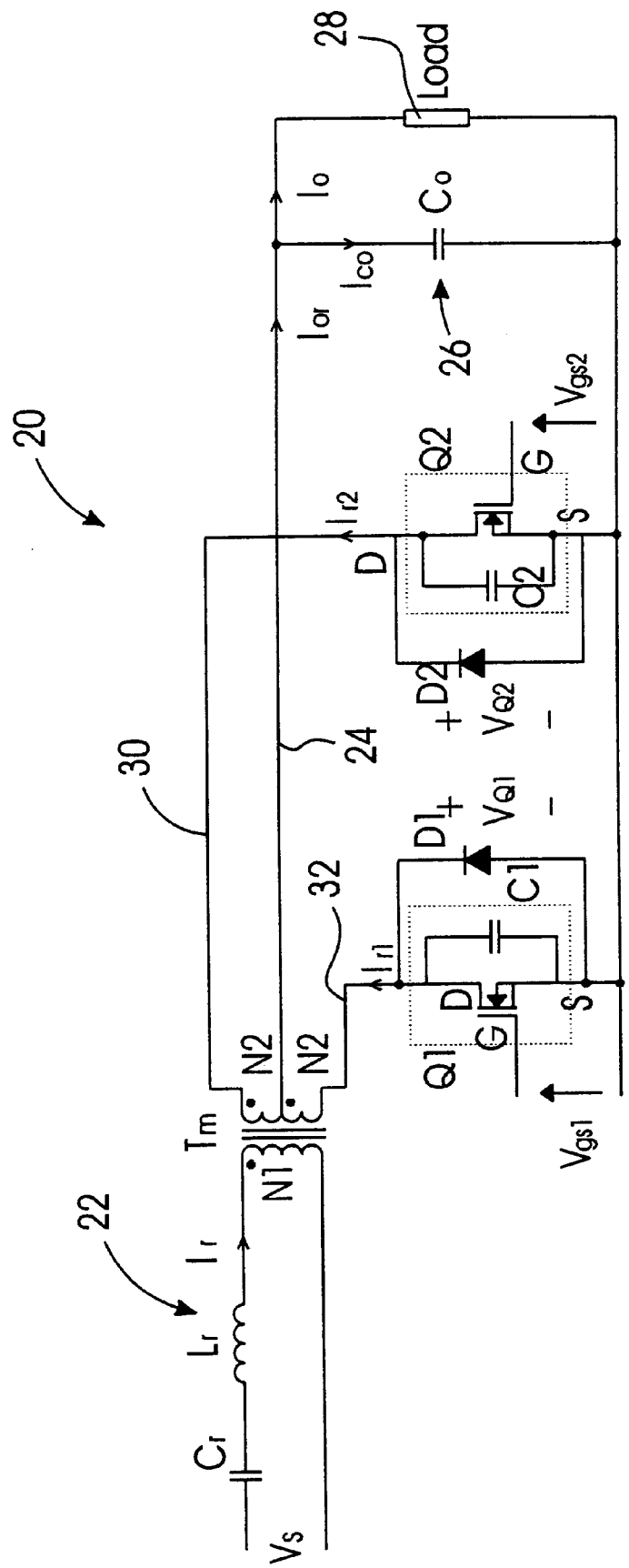
FIG. 2(c): AC/DC converter topology in which the parallel capacitors are the integral parts of the controlled switches.

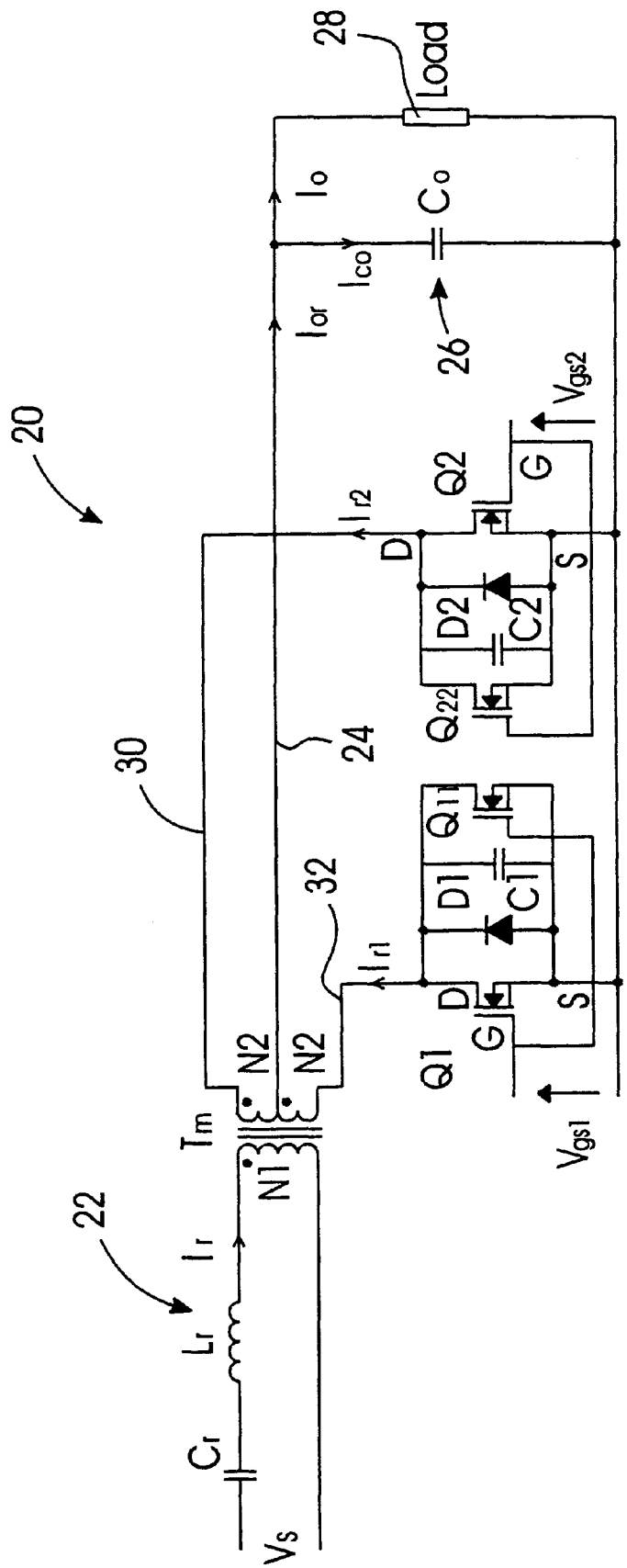
FIG. 2(d): AC/DC converter topology in which more than one control switch is connected in parallel.

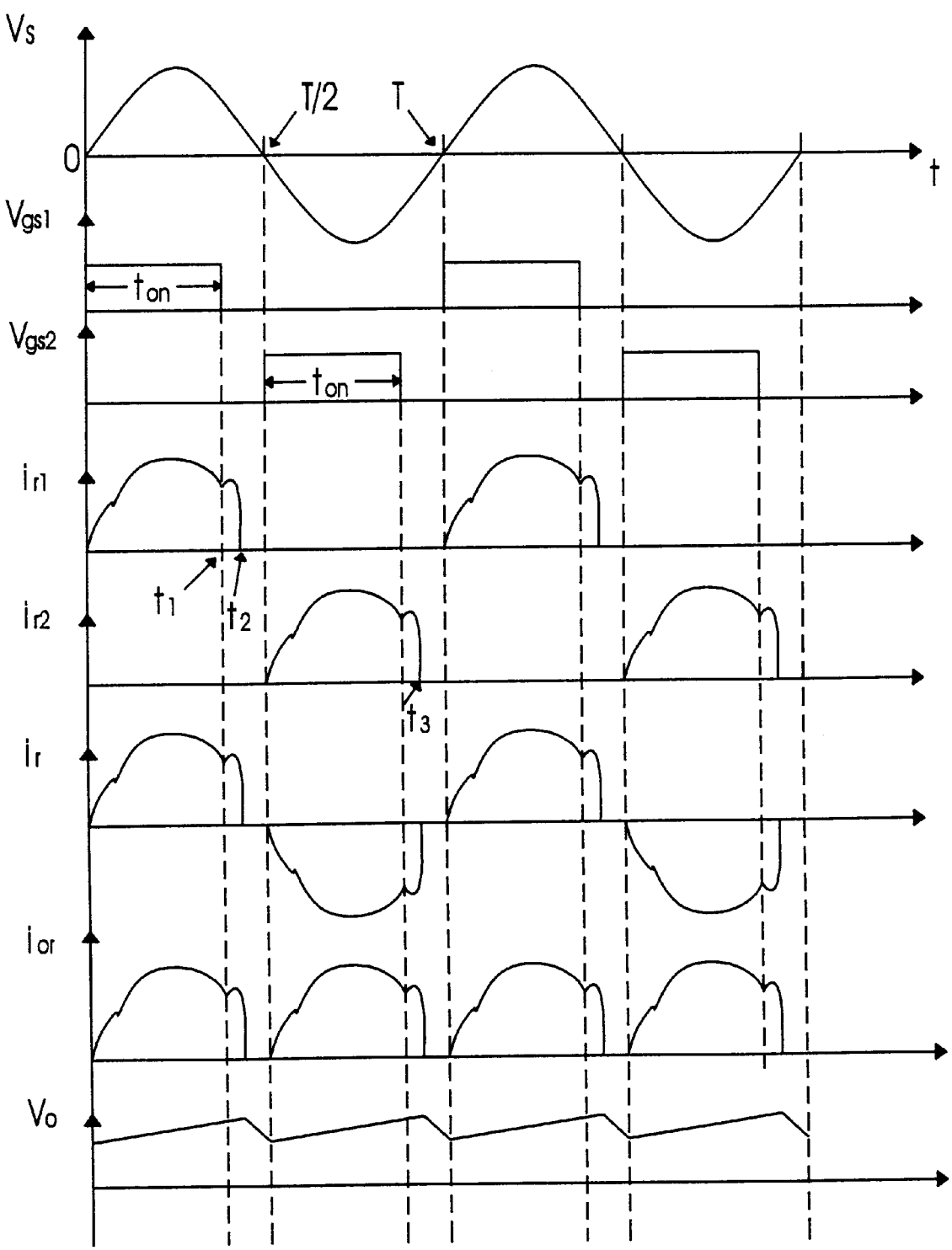
FIG. 3: Operating waveforms of converter shown in FIG.2 operating in Mode 1

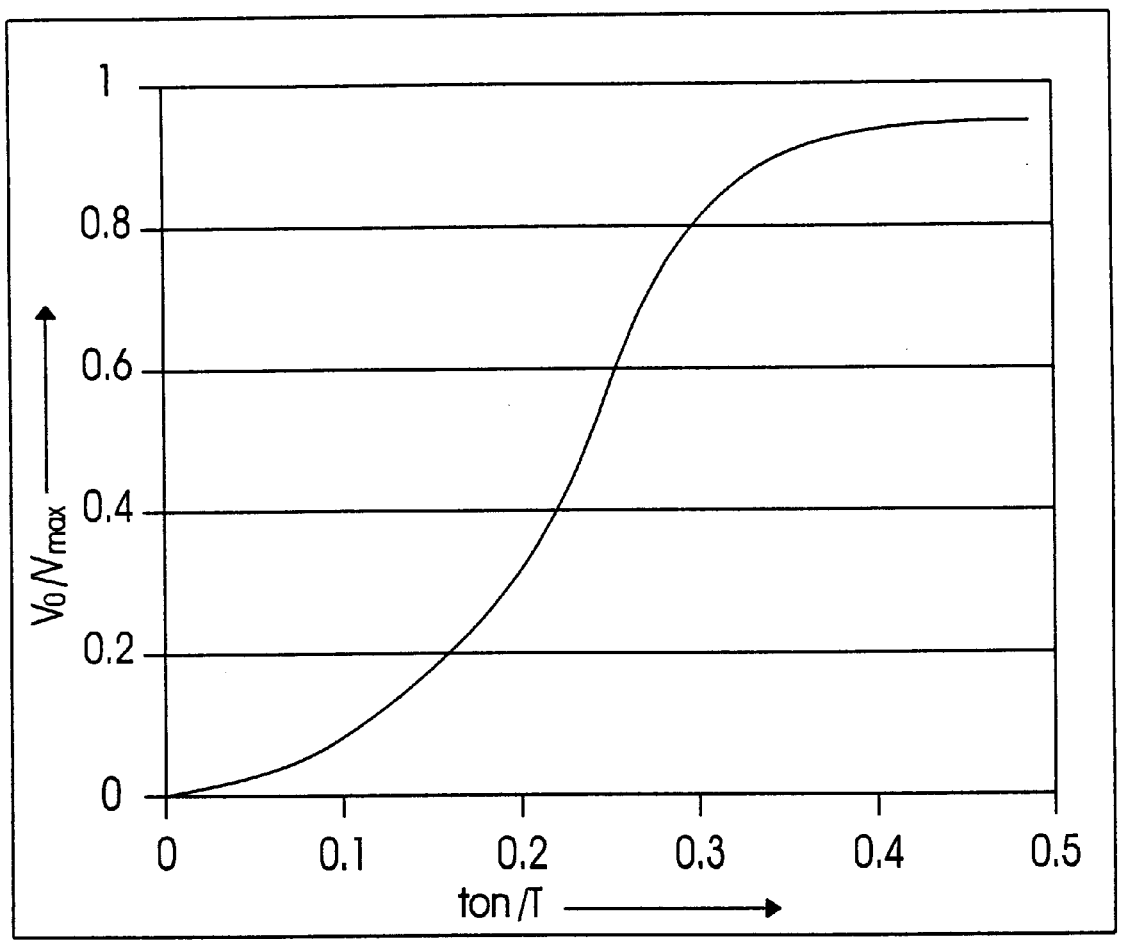
FIG. 4: Output voltage as a function of ton/T for the converter shown in FIG.2 operating in Mode1

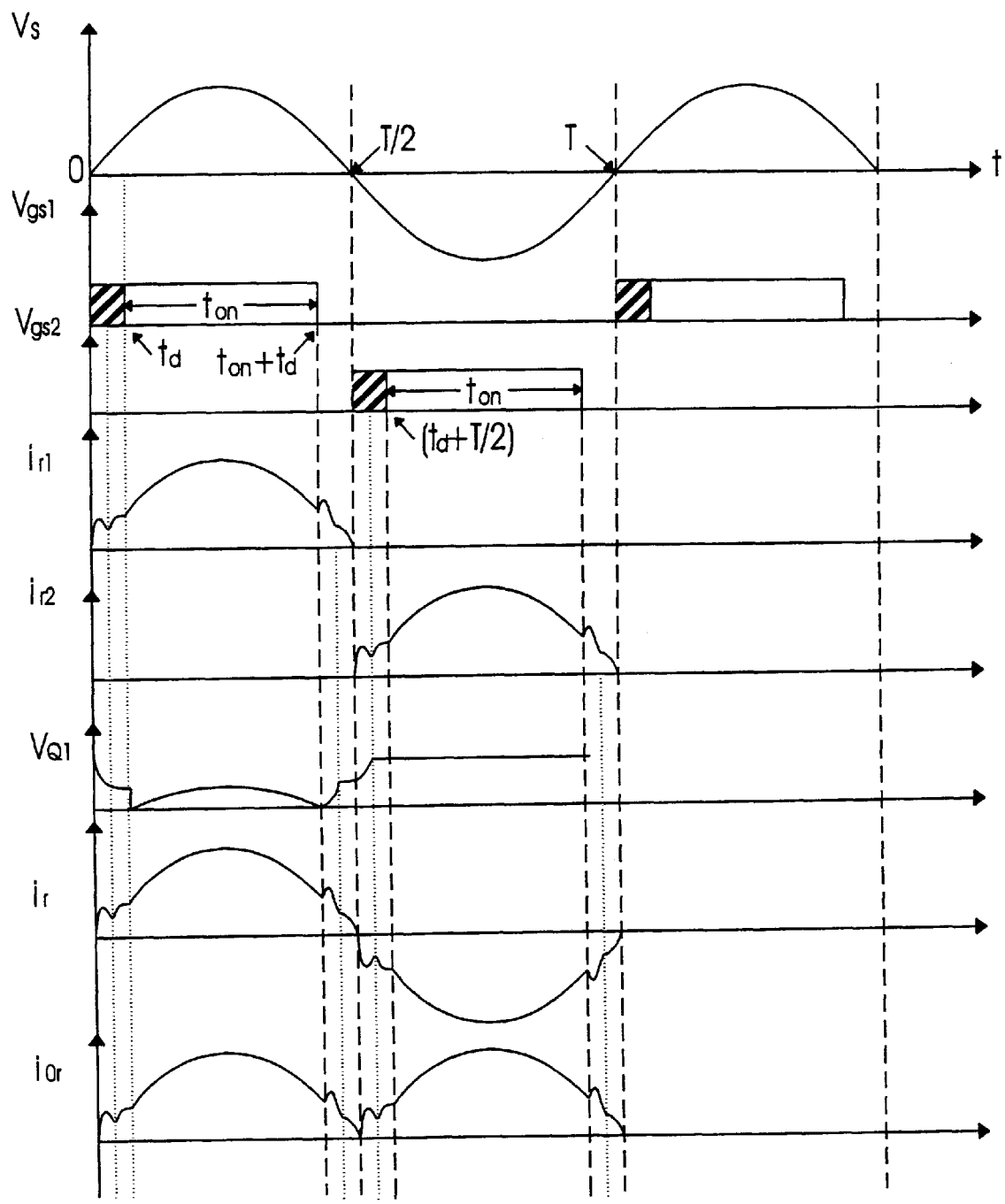
FIG. 5: Operating waveforms of converter shown in FIG.2 operating in Mode 2

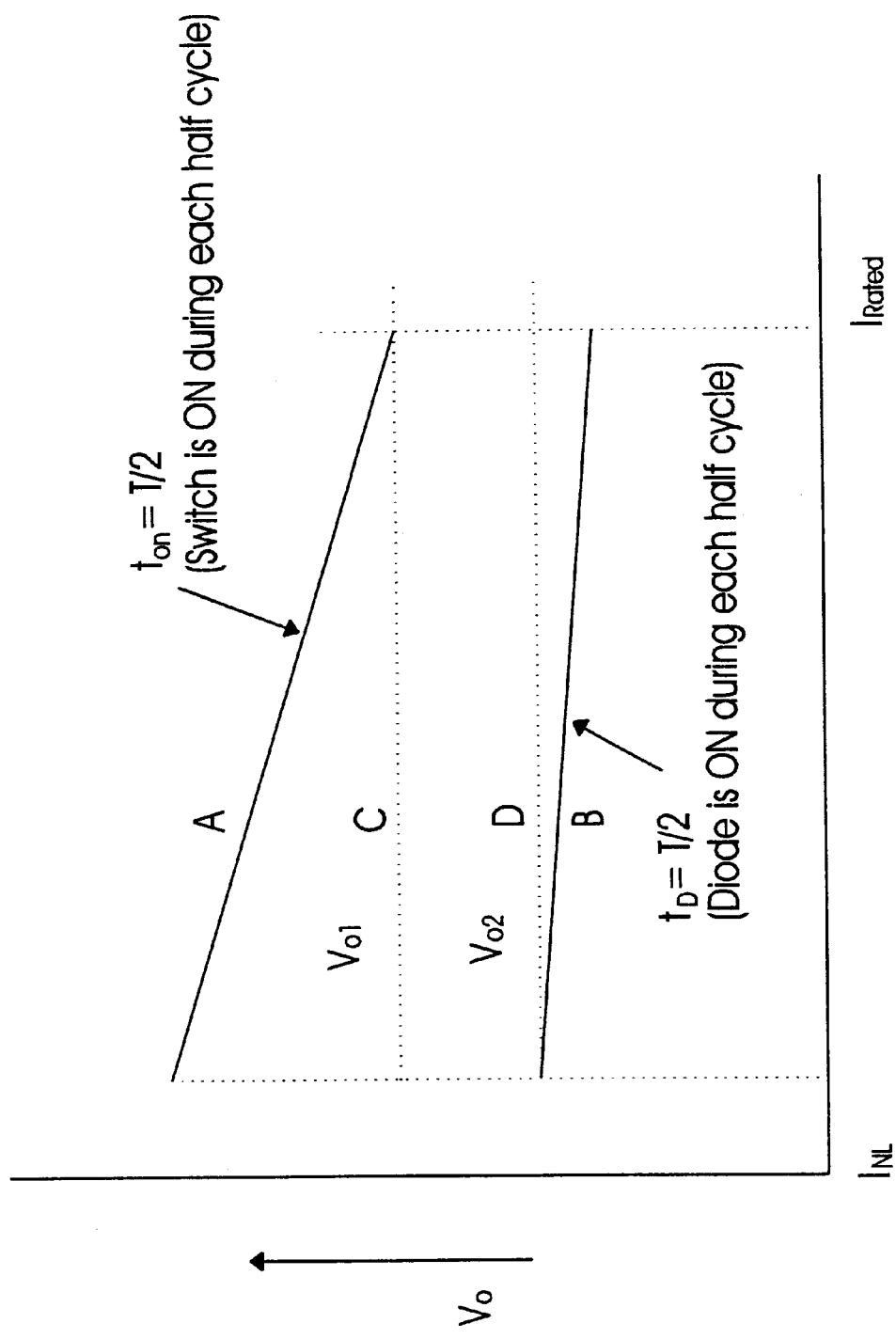
FIG. 6: Output voltage as a function of output current for the converter shown in FIG.2 operating in Mode 2

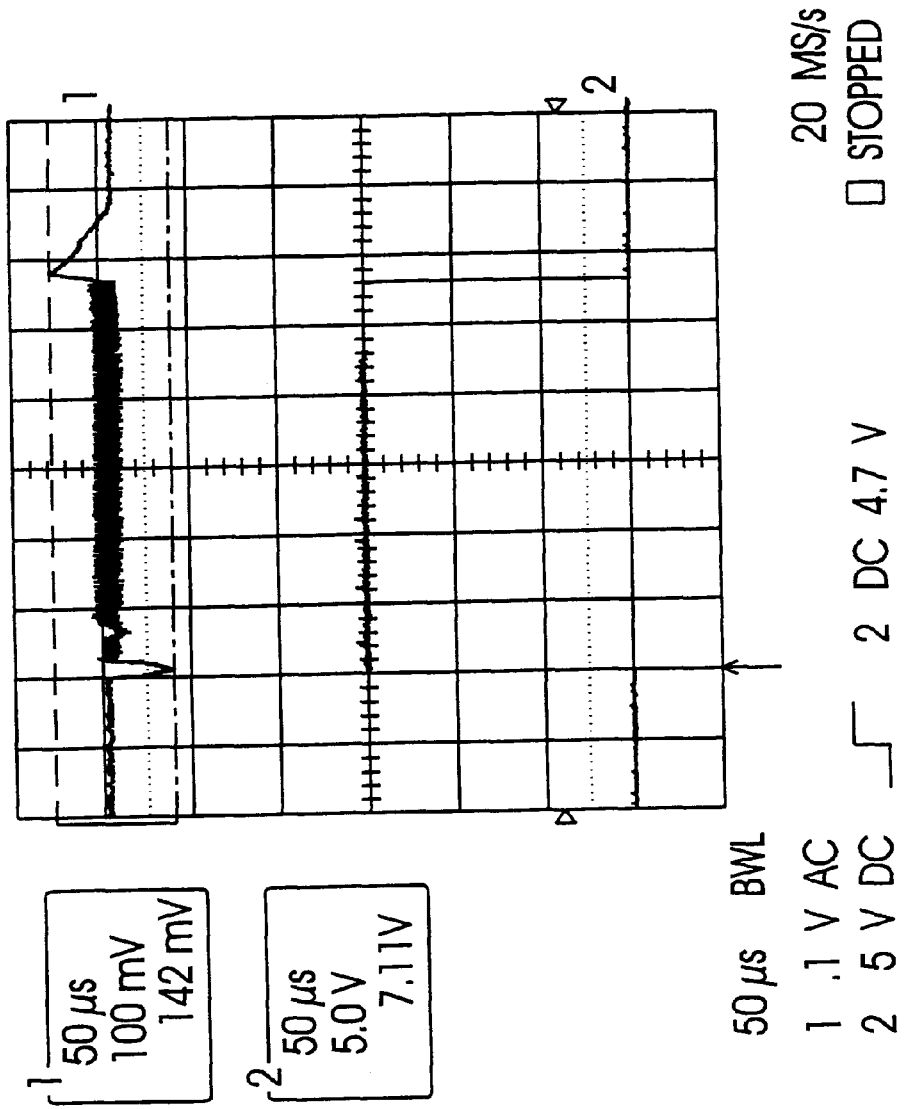
FIG. 7: Output voltage as a function of step change in the output current

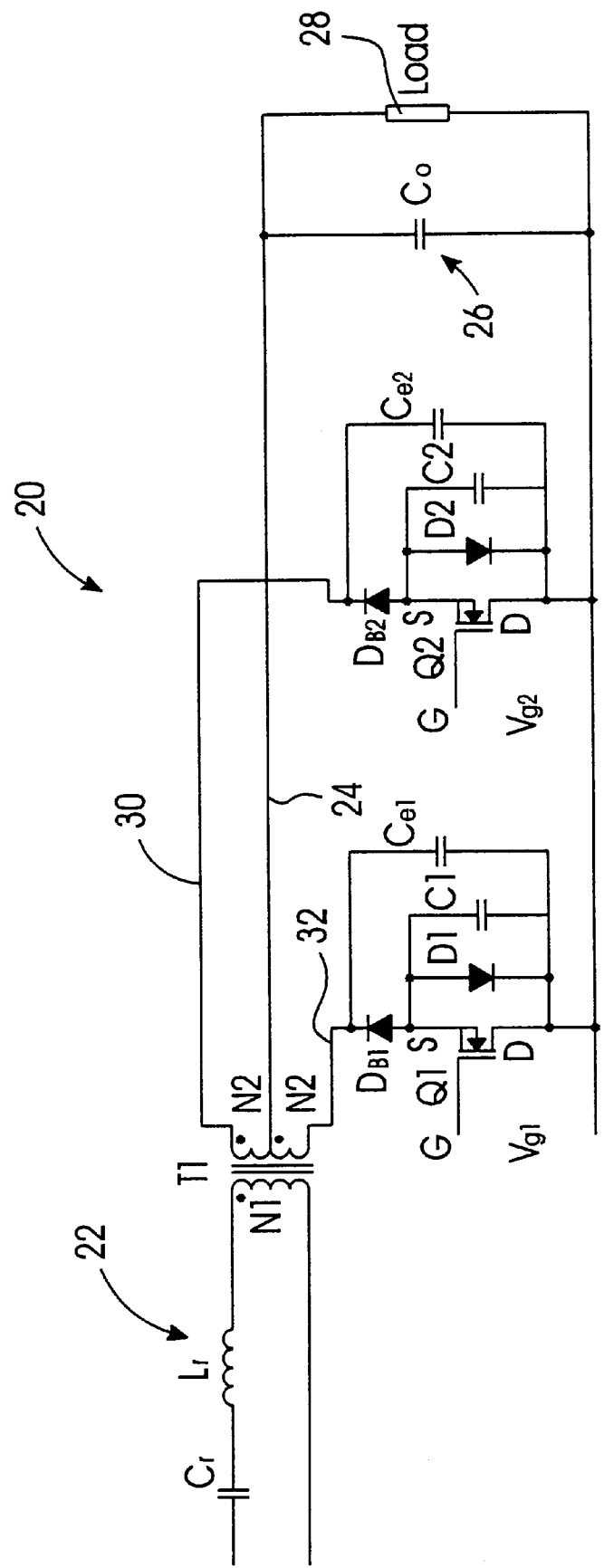
FIG. 8: AC/DC converter with unidirectional current flow in the synchronous rectifiers

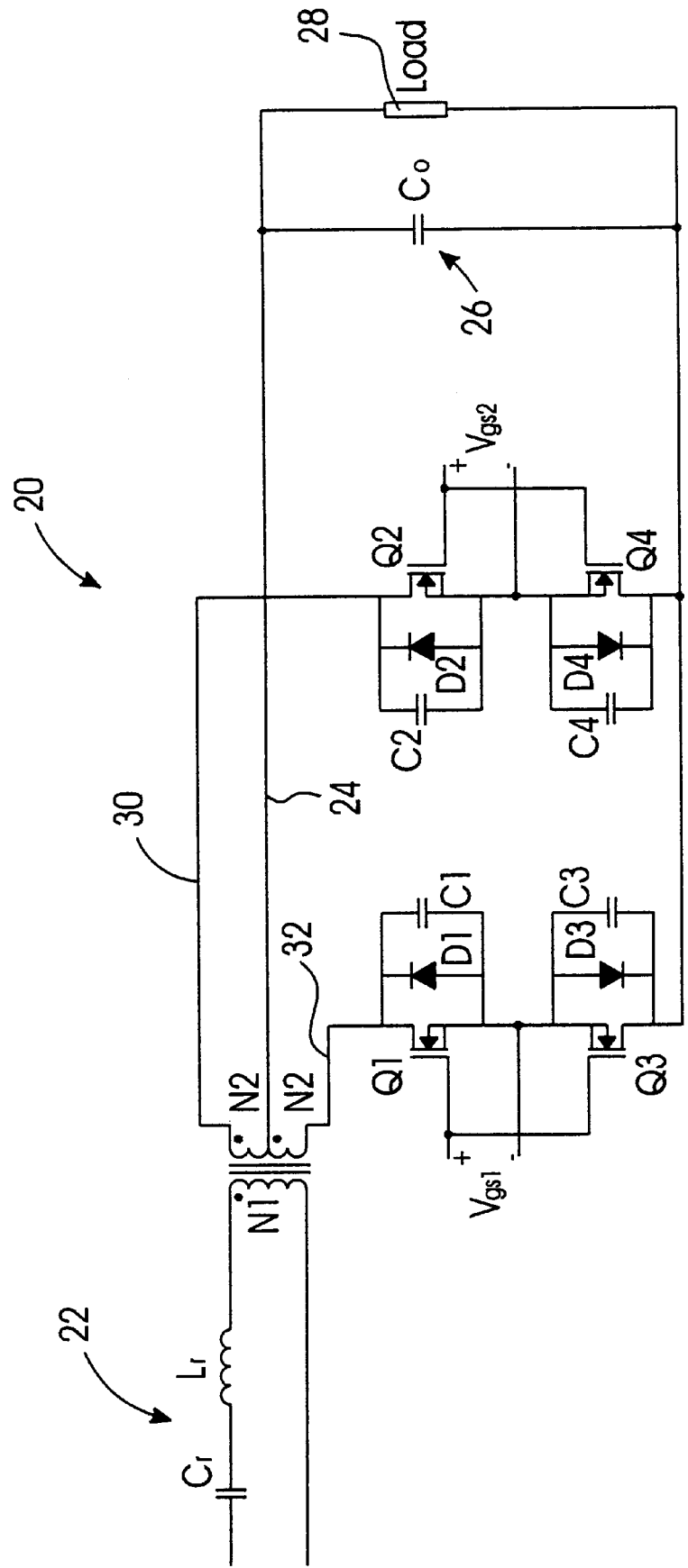
FIG. 9: AC/DC converter with bi-directional synchronous rectifiers

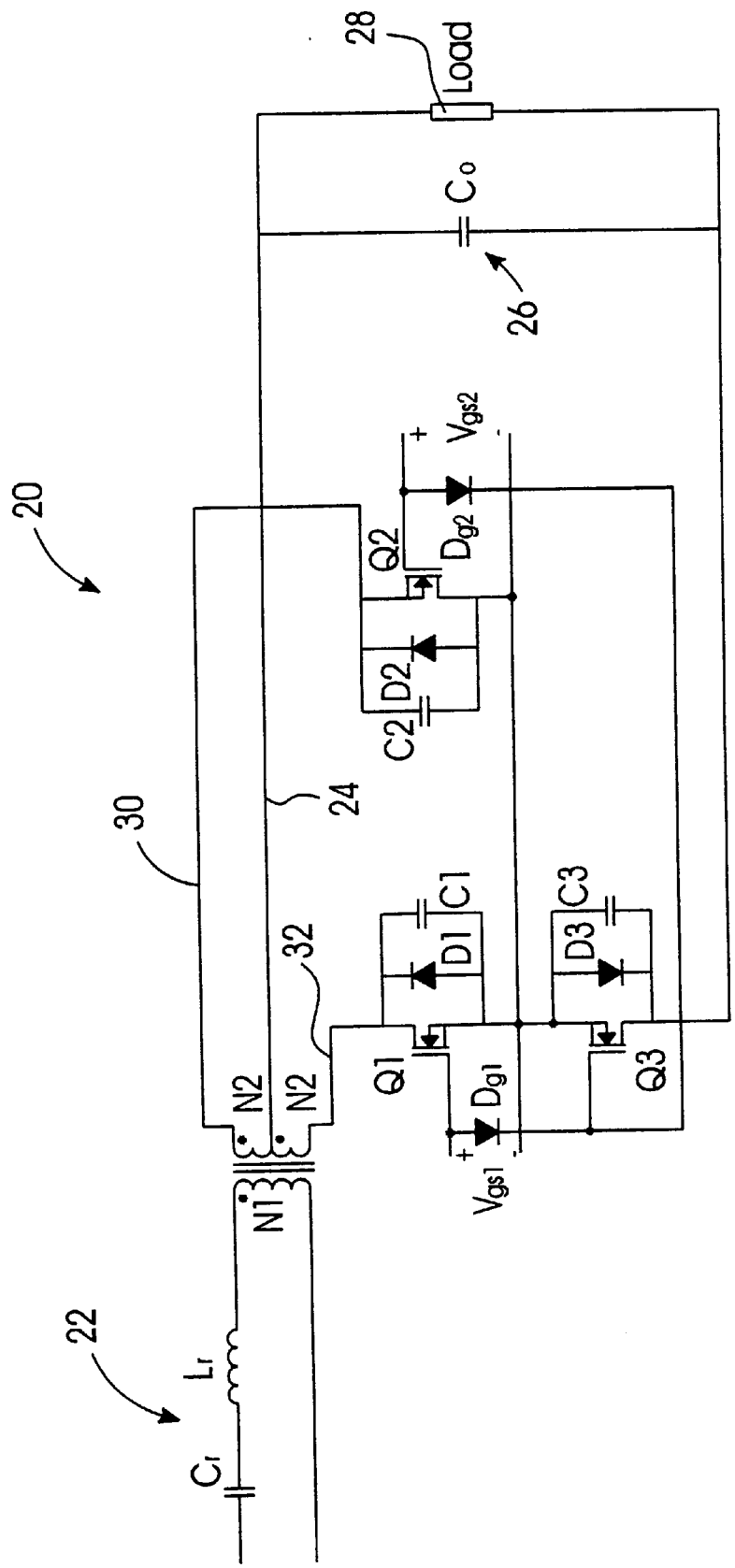
FIG. 10: AC/DC converter with gate signal control switch

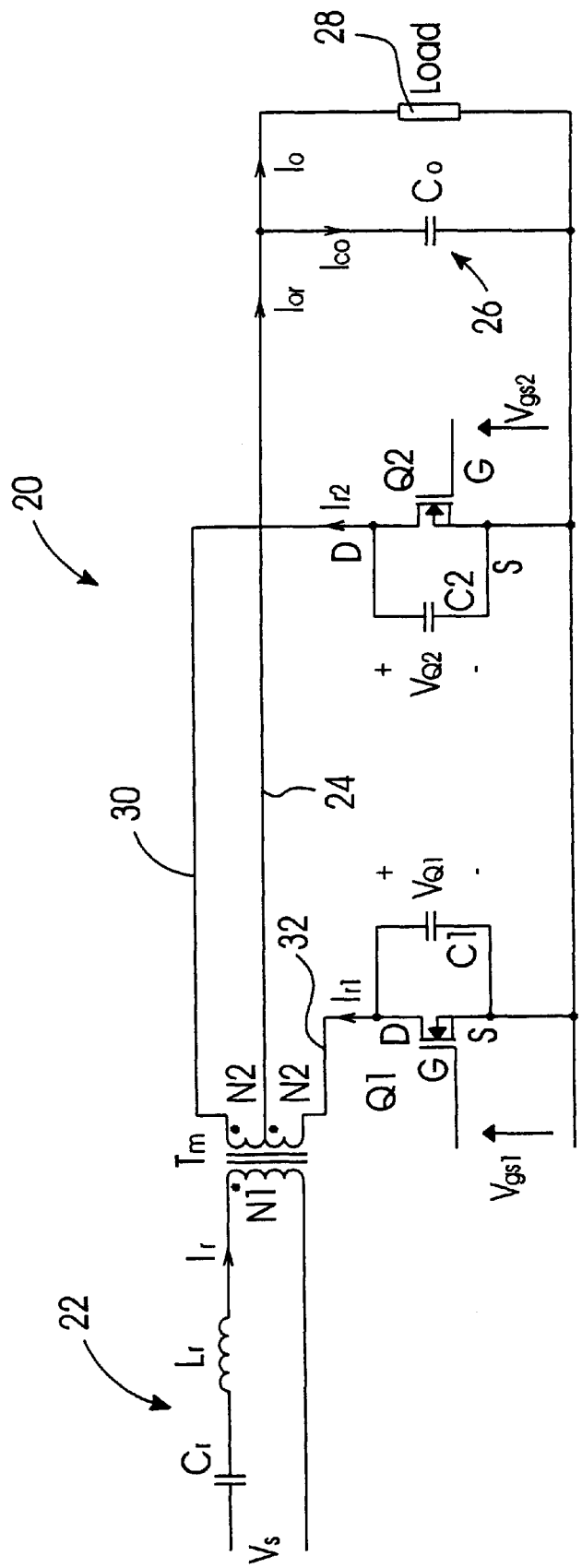
FIG. 11: AC/DC converter using controlled switches without built-in body diodes

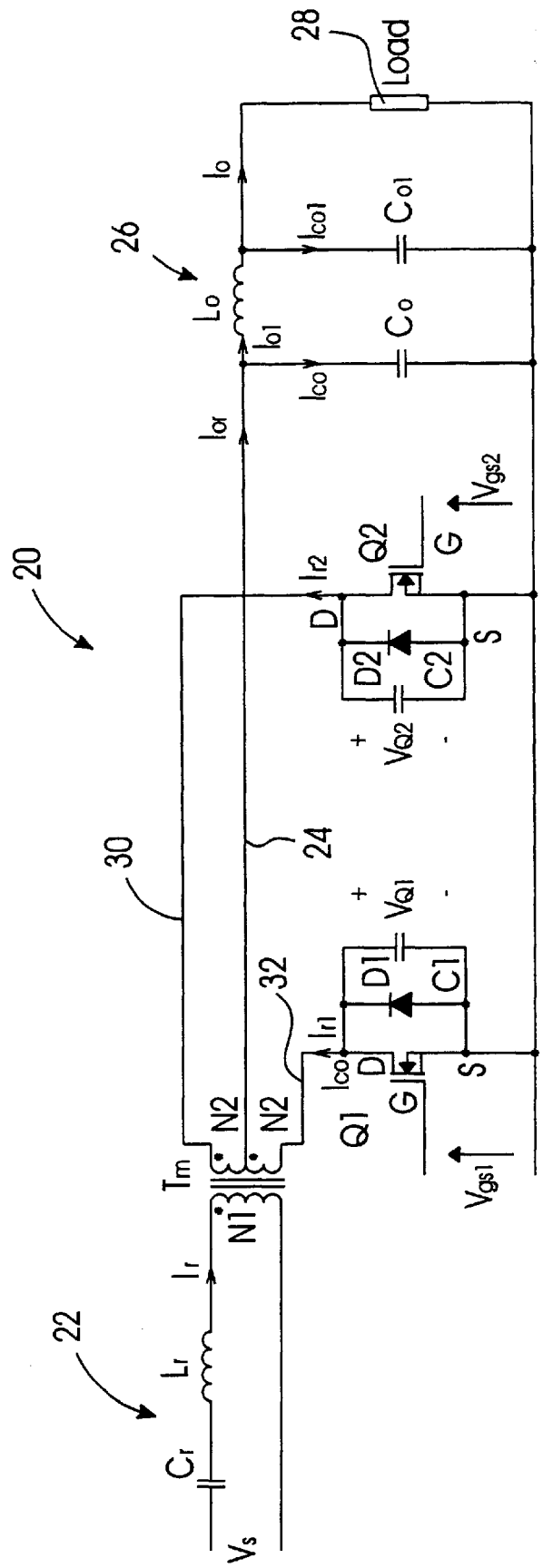
FIG. 12: AC/DC converter with a second stage LC output filter

SINGLE STAGE AC/DC CONVERTER HIGH FREQUENCY AC DISTRIBUTION SYSTEMS

CROSS-REFERENCE TO RELATED APPLICATIONS

This is the first application filed for the present invention.

MICROFICHE APPENDIX

Not Applicable.

TECHNICAL FIELD

This invention relates to power supplies for electronic equipment and, in particular, to converters for power supplies for computer equipment requiring a high current, low voltage power supply.

BACKGROUND OF THE INVENTION

Segments of the personal computer (PC) industry have dramatically changed during the last decade. The future is even more challenging. A dramatic increase in the processor speeds of PCs has required an overwhelming increase in current and associated dynamics (very high slew rate). This already challenging technical requirement is further complicated by a need for voltage reduction, potentially to sub-volt levels.

In the past, there was virtually no challenge in powering computers. A multiple output, very slow power supply called a "Silver Box (SB)" was adapted to meet the requirements of every power demand. However, as silicon development progressed, multiple voltages of less than 3.3V were required. Voltage Regulator Modules (VRMs) on the processor Mother Board (MB) were a logical solution to that problem. Today, the number of VRMs required on the Mother Board is increasing. In addition to the VRMS, a large number of de-coupling capacitors are required in proximity of the processor to meet the requirements of very high slew rate of the current. This has resulted in a rapid increase in the cost, as well as a large reduction in overall efficiency, of the power delivery system.

A number of options for improving this situation have been explored. For example, Advanced Voltage Regulator Module (AVRM) offers the capability to supply high di/dt and high current, however, at increased cost, and with low efficiency and moderately high capacity of the de-coupling capacitors. Replacing low voltage DC distribution with higher DC voltage, such as 48V, is more promising but has a drawback of higher cost. Recently a novel High Frequency Alternating Current (HFAC) power delivery architecture has been proposed for powering the future generation PCs in a reference entitled, "PC Platform Power Distribution System: *Past Application, Today's Challenge and Future Direction*" published in the conference proceedings of International Telecommunications Energy Conference, Copenhagen, Denmark, June 1999 by J. Drobnik, L. Huang, P. Jain and R. Steigerwald. In the HFAC architecture, the system power supply (silver box) generates high frequency and high voltage. The HFAC is then fed to an individual ac-dc converter (ACVRM) and converted into DC of specific parameters at the point of use. The HFAC brings the following advantages:

Low cost;

High efficiency;

Better form factor;

Better reliability; and

Active energy steering.

HFAC is conceptually the simplest architecture proposed to date, which deals with all of the power delivery issues defined above. This includes elimination of duplicated power conversions, and active energy steering without additional components.

The key to successful implementation of an HFAC power delivery system resides in the stage that converts high frequency AC to dc. A number of conventional approaches for this conversion are discussed below.

FIGS. 1(a)–(d) show various known topologies for converting high frequency AC to dc.

FIG. 1(a) shows a converter topology that includes a series resonant circuit, a transformer, diode rectifiers, an output capacitor, a switch operating in a linear range, and a second output capacitor. This circuit is a straightforward AC to DC converter but suffers from excessive conduction losses, due to the use of the rectifying diodes and the linear output switch. The conduction losses are greatest at the low output voltages and high output currents.

A buck converter, shown in FIG. 1(b), can replace the linearly controlled output switch in FIG. 1(a). This arrangement reduces the conduction losses to a certain extent, but increases the switching losses. It also increases control complexity and provides a sluggish transient response due to the presence of an output inductor. A synchronous buck converter operating in a discontinuous mode, shown in FIG. 1(c), can also replace the linearly controlled output switch shown in FIG. 1(a).

The arrangements shown in FIGS. 1(a)–(c) improve the transient response but increase conduction losses significantly.

FIG. 1(d) shows a circuit diagram for converting AC to regulated DC that suffers from high conduction losses due to the diode rectifying stage in the output. Besides, this circuit is unsuitable for high frequency operation because it uses thyristorized switches at the input to control the output voltage.

It is clear from the above discussion that the conventional approaches to converting high frequency AC to regulated DC have low conversion efficiency due to high conduction and/or switching losses, sluggish transient response and complex control circuitry.

There therefore exists a need for a simple power and control circuitry with high conversion efficiency and fast transient response.

SUMMARY OF THE INVENTION

It is an object of the invention to provide an AC/DC converter which outputs high current at low voltages from a high frequency AC source.

It is a further object of the invention to provide an AC/DC converter that outputs high current at low voltages with a high efficiency.

It is a further object of the invention to provide an AC/DC converter that regulates the output DC voltage.

It is another object of the invention to provide an AC/DC converter that outputs high current at low voltage but is inexpensive to construct and simple to control.

An AC/DC converter in accordance with the invention comprises two resonant components connected in series to form a series resonant circuit; a transformer having a primary winding with a first predetermined number of turns and a center tap to a secondary winding with a second predetermined number of turns, the resonant circuit and the primary winding of the transformer being connected in series, and the center tap of the secondary winding being connected to an output filter and a load; two controlled switches, respectively connected to two ends of the secondary winding, a drain of each of the two controlled switches being respectively connected to opposite ends of the secondary winding, and respective sources of the two controlled switches are interconnected; two anti-parallel diodes respectively connected across the two controlled switches; and two capacitors respectively connected across the two controlled switches.

The two resonant components preferably comprise a first resonant component that includes an inductor and a second resonant component consisting of a capacitor connected in series with the resonant circuit.

The output filter is preferably a capacitor connected across the center tap of the transformer and the source of the two controlled switches.

Depending on a turns-ratio of the transformer at the center tap, there are two distinct modes of operation for the AC/DC converter in accordance with the invention. If the turns ratio of the transformer at the center tap is such that the two anti-parallel diodes are always reversed biased for any given output voltage, the AC/DC converter operates in a first mode of operation. If the turns ratio of the transformer at the center tap is such that the two anti-parallel diodes are always forward biased whenever a primary voltage is either positive or negative, the AC/DC converter operates in a second mode of operation.

In the first mode of operation, gating pulses of the two controlled switches are synchronized with a high frequency AC source voltage so that leading edges of the gating pulses are synchronized with a zero crossing of the source voltage. In the second mode of operation, gating pulses of the two controlled switches are synchronized with a high frequency AC source voltage so that the leading edge of the pulse is delayed by a given time duration from a zero crossing of the source voltage.

In an first alternate embodiment of the AC/DC converter in accordance with the invention, the two controlled switches are reversed and a diode is added in series with each controlled switch to block conduction of body diodes of the controlled switches.

In a second alternate embodiment of the AC/DC converter in accordance with the invention, the diodes are respectively replaced by controlled switches.

In a third alternate embodiment of the AC/DC converter in accordance with the invention, a source of each of the two controlled switches is connected to a source of an additional switch, and a drain of the additional switch is connected to a negative pole of a capacitor in the output filter, two additional diodes being used to respectively connect gate signals to the gate and source of the additional switch.

In a fourth alternate embodiment of the AC/DC converter in accordance with the invention, the controlled switches do not have built-in anti-parallel body diodes.

In a fifth alternate embodiment of the AC/DC converter in accordance with the invention, a controlled second stage inductance/capacitance filter at the output reduces ripple in an output voltage.

The invention thereby provides an AC/DC converter that is inexpensive to manufacture, highly efficient, has better form factor, is more reliable, and enables active energy steering.

BRIEF DESCRIPTION OF THE DRAWINGS

Further features and advantages of the present invention will become apparent from the following detailed description, taken in combination with the appended drawings, in which:

FIG. 2 is a circuit diagram of a preferred embodiment of an AC/DC converter in accordance with the invention;

FIG. 2(a) is a circuit diagram of an AC/DC converter topology in which a resonant inductor shown in FIG. 2 is the same as a leakage inductor of the transformer;

FIG. 2(b) is a circuit diagram of an AC/DC converter topology in which anti-parallel diodes shown in FIG. 2 are integral parts of the controlled switches;

FIG. 2(c) is a circuit diagram of an AC/DC converter topology in which parallel capacitors shown in FIG. 2 are integral parts of the controlled switches;

FIG. 2(d) is a circuit diagram of an AC/DC converter topology in which more than one controlled switches are connected in parallel;

FIG. 3 is a graph of operating waveforms showing the output performance of the circuit shown in FIG. 2;

FIG. 4 is a graph showing output voltage as a function of time for the circuit shown in FIG. 2;

FIG. 5 is a graph of operating waveforms showing the output performance of the circuit shown in FIG. 2 when the circuit is operating in an alternate mode;

FIG. 6 is a graph showing output voltage as a function of output current for the circuit shown in FIG. 2 when the circuit is operating in the alternate mode;

FIG. 7 is a graph showing output voltage as a function of step change in output current of the circuit shown in FIG. 2;

FIG. 8 is an alternate embodiment of the invention with unidirectional current flow through synchronous rectifiers of the circuit;

FIG. 9 is an alternate embodiment of the invention with bi-directional current flow through synchronous rectifiers of the circuit;

FIG. 10 is yet a further embodiment of an AC/DC converter circuit in accordance with the invention;

FIG. 11 is another embodiment of an AC/DC converter circuit in accordance with the invention using controlled switches without built-in body diodes; and FIG. 12 is yet another embodiment of an AC/DC converter in accordance with the invention with a second stage inductance/capacitance output filter.

It will be noted that throughout the appended drawings, like features are identified by like reference numerals.

DETAILED DESCRIPTION OF THE PREFERRED EMBODIMENT

Figure 1A:
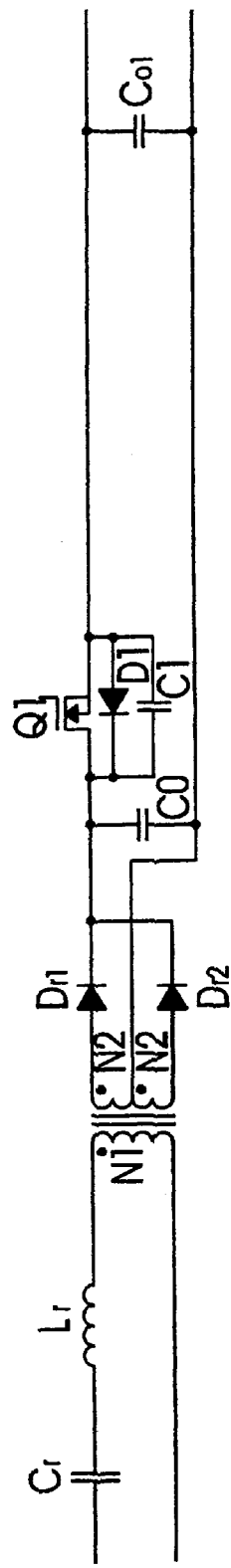
FIGS. 1(a)–(d) are circuit diagrams of prior art circuits for converting high frequency AC to DC.
Figure 1B:
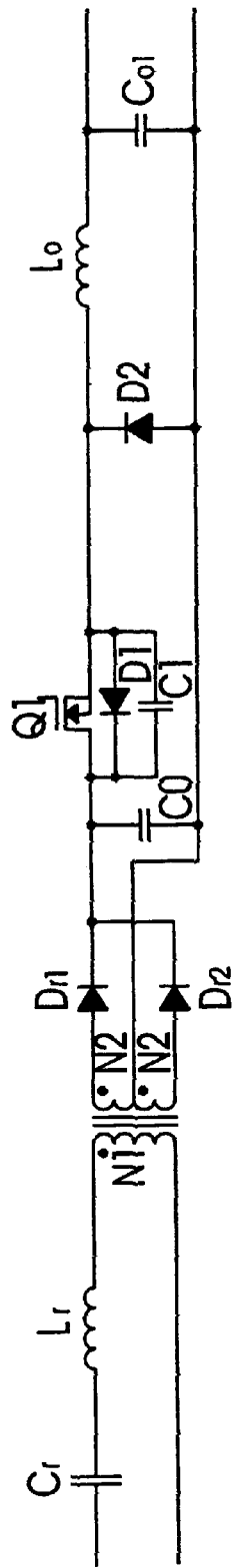
Figure 1C:
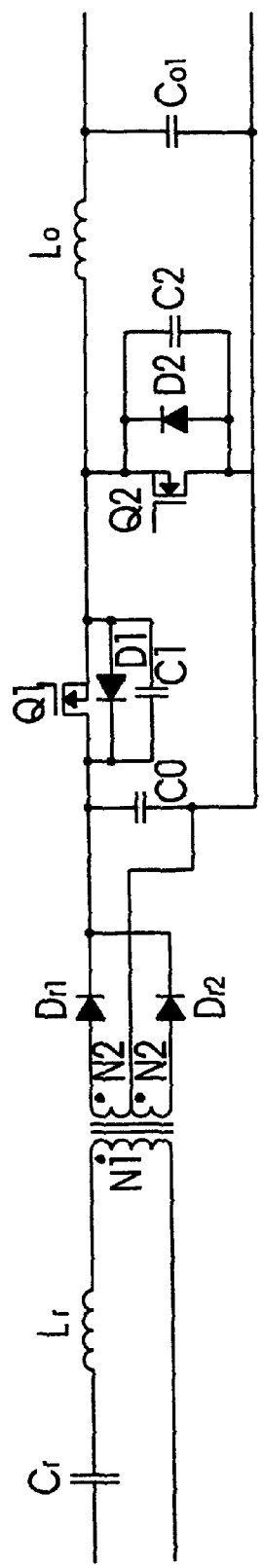
Figure 1D:
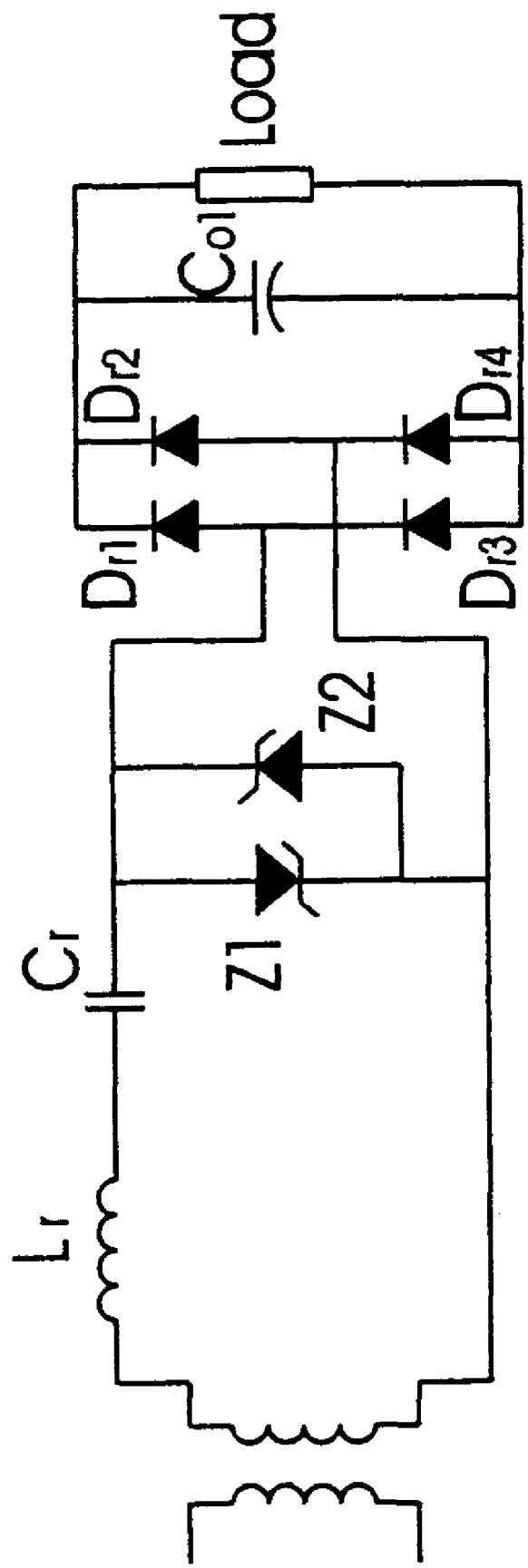

The invention provides an AC/DC converter for efficiently converting high frequency AC to low voltage, high amperage DC current.

Topology of the AC/DC Converter

FIG. 2 is a circuit diagram of a preferred embodiment of the AC/DC converter 20 in accordance with the invention. The AC/DC converter 20 includes two resonant components, a resonant circuit 22 having a capacitor $C_r$ and an inductor $L_r$. Both of the resonant components are connected in series and form a series resonant circuit. As will be understood by those skilled in the art, the series resonant inductor may be an integral part of a transformer $T_m$ as shown in FIG. 2(a). As will also be understood by those skilled in the art, a leakage inductor (not illustrated) of the transformer $T_m$ may also be an integral part of the resonant circuit.

The transformer $T_m$ has a primary winding with $N_1$ turns and a center tap 24 to a secondary winding with $N_2$ turns. The resonant circuit 22 and the primary winding $N_1$ of the transformer $T_m$ are connected in series. The center tap 24 of the secondary winding is connected to an output filter 26 and a load 28 while the other two ends 30, 32 of the secondary winding are connected to two controlled switches $Q_1$ and $Q_2$, respectively. The two controlled switches are preferably MOSFETS or CHFETS, both of which are well known in the art.

A drain of each of the two controlled switches $Q_1$ and $Q_2$, is connected to opposite ends of the secondary winding, while each of the sources of switches $Q_1$ and $Q_2$ are interconnected. Two anti-parallel diodes $D_1$ and $D_2$ are respectively connected across $Q_1$ and $Q_2$. As an alternative, the anti-parallel diodes across the controlled switches may be integral parts of the controlled switches as shown in FIG. 2(b). Two capacitors $C_1$ and $C_2$ are respectively connected across $Q_1$ and $Q_2$. It will also be understood that the capacitors $C_1$ and $C_2$ connected across the controlled switches may alternatively be integral parts of the controlled switches $Q_1$ and $Q_2$ as shown in FIG. 2(c). As an alternative, the controlled switches $Q_1$ and $Q_2$ do not include integral body diodes. As a further alternative, the controlled switches $Q_1$ and $Q_2$ include integral capacitors.

As shown in FIG. 2(d), in a further embodiment each of the two controlled switches include two or more switches connected in parallel.

The output filter 26 is a capacitor $C_0$. The output filter capacitor is connected across the center tap 24 of he transformer $T_m$ and the source of $Q_1$ & $Q_2$.

Operation of the AC/DC Converter

Depending on the turns-ratio ($N_1/N_2$) of the transformer $T_m$ there are two distinct modes of operation or the converter circuit of FIG. 2.

In the first mode of operation (Mode 1), the diodes $D_1$ and $D_2$ are always reversed biased.

In the second mode of operation (Mode 2), the diodes $D_1$ and $D_2$ conduct whenever there is positive or a negative voltage at the primary winding of the transformer $T_m$.

Mode 1

In this mode of operation the turns ratio of the transformer is such that both the diodes $D_1$ and $D_2$ are always reversed biased for any given output voltage. This mode of operation is enabled whenever the anode voltage of the diode is lower than the output voltage $V_0$ minus the forward voltage drop of the diode.

FIG. 3 shows the operating waveforms of the converter of FIG. 2 operating in Mode 1. The gating pulses $V_{gs1}$ and $V_{gs2}$ are synchronized with the high frequency AC source voltage $V_s$ in such a way that a leading edge of the gate pulse is synchronized with the zero crossing of $V_s$. The source voltage $V_s$ is a high frequency AC input voltage and may be a sinusoidal waveform, a trapezoidal waveform, a square waveform, a quasi-square waveform, or a unidirectional voltage waveform.

As shown in FIG. 3, at a position of the cycle where $t=0$, a gating pulse ($V_{gs1}$) with duration $t_{on}$ is applied at the gate of switch $Q_1$. Application of this gate pulse causes a positive resonant current $i_r$ to flow through the resonant circuit. The series inductor $L_r$ and the series capacitor $C_r$ determine the resonant frequency of the circuit. The resonant frequency is given by:

$$\omega_r = 1/\sqrt{(L_r C_r)} \text{ rad/s}.$$

The values of $L_r$ and $C_r$ are selected in such a way that their resonant frequency is close to the frequency of high frequency AC source voltage $V_s$. The positive resonant current $i_r$ also flows to the output load through the conduction of switch $Q_1$. The resonant current $i_{r1}$ flowing through $Q_1$ is equal to: $i_r (N_1/N_2)$. The positive resonant current $i_r$ continuos to flow until $t=t_{on}$ at which instant the gating pulse $V_{gs1}$ from the gate of switch $Q_1$ has been removed. At this point, switch $Q_1$ turns-off and a new resonant circuit which includes $L_r$, $C_r$ and $C_1$ is formed together with the transformer $T_m$ and output filter $C_0$. The reflected value of $C_1$ at the primary side is:

$$C_{1p} = C_1 \times (N_2/N_1)^2$$

and is very small compared to the value of series resonant capacitor $C_r$. A resonant current now flows through the series resonant circuit whose resonant frequency is now primarily determined by the resonant inductor $L_r$ and reflected capacitor $C_{1p}$, and is given by:

$$\omega'_r = 1/\sqrt{(L_r C_{1p})}.$$

As the value of $C_{1p}$ is very small compared to $C_r$, the resonant frequency $\omega'_r$ is very high compared to the resonant frequency $\omega_r$. The substantially higher resonant frequency resonates the current $i_r$ at a much higher frequency and brings it to zero very quickly (at $t=t_2$). At $t=t_2$, the resonant current $i_r$ ceases to flow as both the diodes $D_1$ and $D_2$ are reversed biased and neither of the controlled switches Q1, Q2 has a gating pulse.

At the position of the cycle where $t=T/2$, a gating pulse ($V_{gs2}$) with duration $t_{on}$ is applied at the gate of switch $Q_2$. Application of this gate pulse causes a negative resonant current $i_r$ to flow through the resonant circuit. The resonant frequency of the resonant circuit is primarily determined by the series inductor $L_r$ and the series capacitor $C_r$, and is given by:

$$\omega_r = 1/\sqrt{(L_r C_r)} \text{ rad/s}.$$

The negative resonant current $i_r$ also flows to the output load through the conduction of switch $Q_2$. The resonant current $i_{r2}$ flowing through $Q_2$ is equal to: $i_r (N_1/N_2)$. The conduction of $Q_2$ changes the direction of the flow of current from a negative to a positive direction at the output. The negative resonant current $i_r$ continues to flow until $t=(T/2+t_{on})$ at which instant the gating pulse $V_{gs2}$ from the gate of switch $Q_2$ is removed. At this point, switch $Q_2$ turns-off and a new resonant circuit that includes $L_r$, $C_r$ and $C_1$ is formed together with the transformer $T_m$ and output filter C. The reflected value of $C_1$ at the primary side is:

$$C_{1p} = C_1 \times (N_2/N_1)^2$$

This is very small compared to the value of series resonant capacitor $C_r$. A resonant current now flows through the series resonant circuit whose resonant frequency is now primarily determined by the resonant inductor $L_r$ and reflected capacitor $C_1p$, and is given by:

$$\omega'_r = 1/\sqrt{(L_r C_{1p})}.$$

As the value of $C_{1p}$ is very small compared to $C_r$, the resonant frequency $\omega'_r$ is very high compared to the resonant frequency $\omega_r$. The substantially higher resonant frequency resonates the current $i_r$ at a much higher frequency and brings it to zero very quickly (at $t=t_3$). At $t=t_3$, the resonant current $i_r$ ceases to flow as both the diodes $D_1$ and $D_2$ are reversed biased and neither of the controlled switch has a gating pulse.

The above description reveals that the resonant current $i_r$ is rectified by the conduction of switches $Q_1$ and $Q_2$ at the output, which is filtered by the capacitor $C_0$ to provide output voltage with a small ripple. Also, most of the energy from the input to the output flows during the on-time of switches $Q_1$ and $Q_2$. Therefore, controlling the on-time of the switches controls the output voltage of the converter.

FIG. 4 shows the output voltage of the converter at the rated load as a function of the on-time ($t_{on}$).

Mode 2

In this mode of operation the turns-ratio ($N_1/N_2$) of the transformer is such that both the diodes $D_1$ and $D_2$ are respectively forward biased whenever the primary voltage is either positive or negative. This mode of operation occurs whenever the anode voltage of the diode is greater than the output voltage $V_0$ minus the forward drop of the diode.

FIG. 5 shows the operating waveforms of the converter. The gating pulses $V_{gs1}$ and $V_{gs2}$ are synchronized with high frequency AC source voltage $V_s$ in such a way that the leading edge of the pulse is delayed by a time duration equal to $t_d$ from the zero crossing of $V_s$. This is used to obtain near zero voltage switching of the switches $Q_1$ and $Q_2$. As noted above with respect to the description of Mode 1, the source voltage $V_s$ may be a sinusoidal waveform, a trapezoidal waveform, a square waveform, a quasi-square waveform, or a unidirectional voltage waveform.

As shown in FIG. 5, prior to a position in the cycle where t=0, the capacitor $C_1$ across $Q_1$ has been charged at a voltage level sufficient to reverse bias the diode $D_1$. At the position of the cycle where t=0, a resonant circuit is formed that includes $L_r$, $C_r$ and $C_1$. Positive source voltage $V_s$ forces the positive resonant current $i_r$ to flow through the resonant circuit and discharge the capacitor $C_1$.

Whenever, the capacitor voltage falls to a level equal to the forward voltage drop of $D_1$, diode $D_1$ starts to conduct and carries the positive resonant current $i_r$ through the primary winding $N_1$ and $i_{r1}$ through the secondary winding $N_2$ of $T_m$. At $t=t_d$, the positive gate to source voltage $V_{gs1}$ turns on the switch $Q_1$ and a positive resonant current now flows through $Q_1$. At $t=t_d+t_{on}$, the positive gate to source voltage $V_{gs1}$ is removed from the gate of switch $Q_1$, which turns-off $Q_1$. The resonant current is now diverted from $Q_1$ to $C_1$ which begins charging $C_1$. Whenever the voltage across $C_1$ reaches a level of the forward voltage drop of $D_1$, $D_1$ starts to conduct and carries the resonant current until the resonant current becomes zero, which turns off the diode $D_1$.

Prior to a position in the cycle where t=T/2, the capacitor $C_2$ across $Q_2$ has been charged to a voltage level sufficient to reverse bias the diode $D_2$. At the position of the cycle where t=T/2, a resonant circuit is formed that includes $L_r$, $C_r$ and $C_2$. Negative source voltage $V_s$ forces the negative resonant current $i_r$ to flow through the resonant circuit and discharges the capacitor $C_2$.

Whenever the capacitor voltage falls to a level equal to the forward voltage drop of diode $D_2$, diode $D_2$ starts to conduct and carries the resonant current $i_r$ through the primary winding $N_1$ of $T_m$ and $i_{r2}$ through the secondary). At $t=(T/2+t_d)$, the positive gate to source voltage $V_{gs2}$ turns on the switch $Q_2$ and the resonant current now flows through $Q_2$. At $t=(T/2+t_d+t_{on})$, the positive gate to source voltage $V_{gs2}$ is removed from the gate of switch $Q_2$ which turns-off $Q_2$. The resonant current now diverted from $Q_2$ to $C_2$ which starts charging $C_2$. Whenever the voltage across $C_2$ reaches to the level of forward voltage drop of $D_2$, $D_2$ starts to conduct and carries the resonant current until the resonant current becomes zero to turn-off the diode $D_2$.

It can be seen from the above description that the power from the input to the output flows through the anti-parallel diodes $D_1$ and $D_2$ for part of the cycle and through the switches $Q_1$ and $Q_2$ for remaining part of the cycle. The diodes $D_1$ and $D_2$ have a higher voltage drop across them in comparison to the voltage drop across $Q_1$ and $Q_2$ when they are conducting. This means that the output voltage of the converter can be controlled, by controlling the conduction of the switches Q1, Q2 and/or diodes D1, D2.

The output voltage of the converter is given by:

$$V_o=(V_T-V_D)t_D/T+(V_T-I_oR_{on})t_{on}/T \quad (1)$$

Where:

$V_T$=Transformer secondary voltage;

$V_D$=Forward voltage drop of the anti-parallel diodes;

$I_o$=Output current;

$R_{on}$=On resistance of the switch;

$t_D$=Anti-parallel diode conduction time;

$t_{on}$=Switch conduction time; and

T=Period of the supply frequency.

FIG. 6 shows the output voltage of the converter shown in FIG. 2 when operating in mode 2. Graph A shows the output voltage of the converter when both the switches Q1, Q2 are completely switched on during the half-cycle of the input voltage $V_s$. This graph illustrates that the output voltage increases as the output current decreases. Graph B shows that the output voltage of the converter when only the diodes D1, D2 are conducting. The output voltage of the converter, when only the diodes D1, D2 are conducting is much lower than when the switches Q1, Q2 are fully on during a half switching period. Therefore, if the switches can be kept on for a portion of the cycle and the diodes for the remaining portion of the cycle, the output voltage can be kept constant as shown by graphs C and D. The region between graphs C and D defines the range of control for which the output voltage can be controlled, and can be kept constant.

OUTPUT OF THE CONVERTER

The converter shown in FIG. 2 was constructed using component values as shown in Table 1 to convert 30V RMS, 500 kHz AC voltage to 2.0V output at 20A. The converter demonstrated an overall efficiency of greater than 80% at the rated load.

TABLE 1

| | |
|---|---|
| Rssonant capacitor | 22 nanoFarads |
| Resonant inductor | 4.6 micro Henery |
| Primary number of turns | 14 |
| Secondary number of turns | 1 |
| Controlled switch Q1 | IRL 3803 two in parallel |
| Controlled switch Q2 | IRL 3803 two in parallel |
| Output filter capacitance | 600 micro Farads |

FIG. 7 shows the output voltage of the converter for a 2 Amperes (2A) to 20A and 20A to 2A step load (di/dt=500A/$\mu$s). This figure shows that there is a relatively constant, steady state output voltage for both 2A and 20A load currents. Also, the under-shoot and over-shoot in the output voltage are less than 5%, even though there is a significant step change in the output current.

Alternate Embodiments of the AC/DC Converter Topology

The converter circuit of FIG. 2 is preferred for a low output voltage (about 5V or less). However, at higher output voltages the range of the output voltage control becomes more narrow and it becomes difficult to maintain constant output voltage for varying output load.

FIG. 8 shows another embodiment of an AC/DC converter in accordance with the invention, in which both the switches $Q_1$ and $Q_2$ have been reversed and a diode DB1, DB2 has been added in series with each switch $Q_1$ and $Q_2$. This blocks the conduction of the body diodes D of switches Q1, Q2. The operation of the converter of FIG. 8 is essentially the same as the operation of the converter circuit shown FIG. 2 when it operates in Mode 1.

The series diodes $D_{B1}$ and $D_{B2}$ cause higher conduction loss and can be replaced by control switches $Q_{B1}$ and $Q_{B2}$, respectively as shown in FIG. 9. The operation of the converter of FIG. 9 is essentially the same as the operation of the converter circuit shown in FIG. 2, operating in Mode 1.

FIG. 10 shows yet another embodiment of AC/DC converter in accordance with the invention, in which the source of Q1 and Q2 are connected to the source of an additional switch Q3. The drain of Q3 is connected to the negative pole of output capacitor $C_0$. Two additional diodes $D_{g1}$ and $D_{g2}$ are used to connect the gate signals $V_{gs1}$ and $V_{gs2}$ to the gate and source of the switch $Q_3$, respectively. The operation of the AC/DC converter circuit shown in FIG. 10 is similar to the operation of the converter circuit shown FIG. 2 when it operates in Mode 1.

FIG. 11 shows yet another embodiment of the AC/DC converter in accordance with the invention in which the controlled switches do not have built-in anti-parallel body diodes. The operation of this converter is same as the operation of the AC/DC converter circuit shown in FIG. 2 when operating in Mode 1.

FIG. 12 shows a further AC/DC converter in accordance with the invention in which a second stage LC filter 40 is used at the output to further reduce the ripple in the output voltage. The operation of the circuit is essentially the same as the operation of the AC/DC converter shown in FIG. 2 operating in either Mode 1 or Mode 2.

The embodiments of the invention described above are intended to be exemplary only. The scope of the invention is therefore intended to be limited solely by the scope of the appended claims.

I claim:

1. An AC/DC converter, comprising:
   a) resonant components connected in series to form a series resonant circuit;
   b) a transformer having a primary winding with a first predetermined number of turns and a center tap to a secondary winding with a second predetermined number of turns, the resonant circuit and the primary winding of the transformer being connected in series, and the center tap of the secondary winding being connected to an output filter and a load;
   c) two controlled switches regulated to control output voltage of the AC/DC converter, the two controlled switches being, respectively connected to two ends of the secondary winding, a drain of each of the two controlled switches being respectively connected to opposite ends of the secondary winding, and respective sources of the two controlled switches being interconnected; and
   d) means respectively connected across the two controlled switches for providing a current path around the two controlled switches.

2. An AC/DC converter as claimed in claim 1 wherein the means connected across the two controlled switches comprises an anti-parallel diode and a capacitor respectively connected across each of the two controlled switches.

3. An AC/DC converter as claimed in claim 2 wherein the turns ratio of the transformer at the center tap is such that the two anti-parallel diodes are always reversed biased for any given output voltage.

4. An AC/DC converter as claimed in claim 3 wherein gating pulses of the two controlled switches are synchronized with a high frequency AC source voltage so that leading edges of the gating pulses are synchronized with a zero crossing of the source voltage.

5. An AC/DC converter as claimed in claim 2 wherein the turns ratio of the transformer at the center tap is such that the two anti-parallel diodes are always forward biased whenever a primary voltage is either positive or negative.

6. An AC/DC converter as claimed in claim 5 wherein gating pulses of the two controlled switches are synchronized with a high frequency AC source voltage so that the leading edge of the pulse is delayed by a given time duration from a zero crossing of the source voltage.

7. An AC/DC converter as claimed in claim 2 wherein the anti-parallel diodes connected across the controlled switches are integral parts of the controlled switches.

8. An AC/DC converter as claimed in claim 2 wherein the capacitors connected across the controlled switches are integral parts of the controlled switches.

9. An AC/DC converter as claimed in claim 1 wherein each controlled switch comprises several controlled switches connected in parallel.

10. An AC/DC converter as claimed in claim 1 wherein the output filter is a capacitor.

11. An AC/DC converter as claimed in claim 1 wherein the output filter capacitor is connected across the center tap of the transformer and the sources of the two controlled switches.

12. An AC/DC converter as claimed in claim 1 wherein depending on a turns-ratio of the transformer at the center tap, there are two distinct modes of operation for the AC/DC converter.

13. An AC/DC converter as claimed in claim 1 wherein the series resonant circuit comprises two resonant components and a first of the resonant components comprises an inductor.

14. An AC/DC converter as claimed in claim 13 wherein a second resonant component comprises a capacitor connected in series with the inductor.

15. An Ac/DC converter as claimed in claim 13 wherein the inductor is an integral part of the output transformer.

16. An AC/DC converter as claimed in claim 1 wherein a leakage inductor of the transformer is an integral part of the resonant circuit.

17. An AC/DC converter as claimed in claim 1 wherein the two controlled switches are reversed and a diode is added in series with each controlled switch to block conduction of body diodes of the controlled switches.

18. An AC/DC converter as claimed in claim 1 wherein the two controlled switches are reversed and another controlled switch is added in series with each of the two controlled switches to block conduction of body diodes of the respective two controlled switches.

19. An AC/DC converter as claimed in claim 1 wherein a source of each of the two controlled switches is connected to a source of an additional switch, and a drain of the additional switch is connected to a negative pole of a capacitor in the output filter, and two additional diodes respectively connect gate signals to the gate and source of the additional switch.

20. An AC/DC converter as claimed in claim 1 wherein the controlled switches do not include integral anti-parallel body diodes.

21. An AC/DC converter as claimed in claim 20 wherein the controlled switches include integral capacitors.

22. An AC/DC converter as claimed in claim 1 wherein a second stage inductance/capacitance filter at the output reduces ripple in an output voltage.

23. An AC/DC converter as claimed in claim 1 wherein the controlled switches are the MOSFETs.

24. An AC/DC converter as claimed in claim 1 wherein the controlled switches are the CHFETs.

25. An AC/DC converter as claimed in claim 1 wherein the AC input voltage is a sinusoidal waveform.

26. An AC/DC converter as claimed in claim 1 wherein the AC input voltage is a trapezoidal waveform.

27. An AC/DC converter as claimed in claim 1 wherein the AC input voltage is a square waveform.

28. An AC/DC converter as claimed in claim 1 wherein the AC input voltage is a quasi-square waveform.

29. An AC/DC converter as claimed in claim 1 wherein the AC input voltage is a unidirectional voltage waveform.

30. A method of converting high frequency alternating current (AC) to high amperage, low voltage direct current (DC), comprising the steps of:
   a) supplying high frequency AC input voltage to a resonance circuit having a resonance frequency approximate the frequency of the input voltage, the resonance circuit being connected to a transformer having a primary winding with a first number of turns and a center tap to a secondary winding with a second, fewer number of turns;
   b) rectifying a current output by the transformer by controlling at least two switches having respective drains connected to opposite ends of the secondary winding and interconnected sources, and means connected across the switches to provide a current path around the switches;
   c) regulating an output voltage of the AC/DC converter by controlling an on-time of the at least two switches; and
   d) filtering the output current using an output filter connected across the center tap of the transformer and the sources of the at least two switches to provide an output voltage with a small current ripple.

31. A method as claimed in claim 30 wherein the means connected across the switches to provide a current path around the switches comprises an anti-parallel diode and a capacitor connected across each of the at least two switches.

32. A method as claimed in claim 31 wherein the number of second turns in the secondary winding is such that the anti-parallel diodes are always back biased, and the output voltage of the converter is controlled by controlling an on-time of the at least two switches.

33. A method as claimed in claim 32 wherein gating pulses of the at least two switches are synchronized with a high frequency AC source voltage so that leading edges of the gating pulses are synchronized with a zero crossing of the source voltage.

34. A method as claimed in claim 31 wherein the number of second turns in the secondary winding is such that the anti-parallel diodes are always forward biased, and the output voltage of the converter is controlled by controlling conduction through the at least two switches and the anti-parallel diodes.

35. A method as claimed in claim 31 wherein the output voltage $V_o$ of the converter is characterized by:

$$V_o = (V_T - V_D)t_D/T + (V_T - I_o R_{on})t_{on}/T$$

Where:
   $V_T$=Transformer secondary winding output voltage;
   $V_D$=Forward voltage drop of each of the anti-parallel diodes;
   $I_o$=Output current;
   $R_{on}$=On resistance of each of the at least two switches;
   $t_D$=Conduction time of the respective anti-parallel diodes;
   $t_{on}$=Conduction time of the respective at least two switches; and
   T=Period of the AC input voltage frequency.

36. A method as claimed in claim 31 wherein the resonance circuit comprises a series connected inductance and a capacitor to form a series resonant circuit.

37. A method as claimed in claim 30 wherein the output filter comprises a capacitor connected across the center tap of the transformer and the sources of the at least two switches.

38. A method as claimed in claim 30 wherein the at least two switches are the MOSFETs.

39. A method as claimed in claim 30 wherein the at least two switches are the CHFETs.

40. A method as claimed in claim 30 wherein the AC input voltage is a sinusoidal waveform.

41. A method as claimed in claim 30 wherein the AC input voltage is a trapezoidal waveform.

42. A method as claimed in claim 30 wherein the AC input voltage is a square waveform.

43. A method as claimed in claim 30 wherein the AC input voltage is a quasi-square waveform.

44. A method as claimed in claim 30 wherein the AC input voltage is a unidirectional voltage waveform.

45. A method as claimed in claim 30 wherein gating pulses of the two controlled switches are synchronized with a high frequency AC source voltage so that the leading edge of the pulse is delayed by a given time duration from a zero crossing of the source voltage.

* * * * *